3,081,351
Patented Mar. 12, 1963

3,081,351
NOVEL CHEMICAL SYNTHESIS FOR ALKYL-SULFONIUM PERCHLORATES
Terry W. Milligan, Belmont, Mass., assignor to Polaroid Corporation, Cambridge, Mass., a corporation of Delaware
No Drawing. Filed June 19, 1961, Ser. No. 117,819
2 Claims. (Cl. 260—607)

This application relates to the synthesis of sulfonium salts and more particularly to novel processes for the direct synthesis of both symmetrical and unsymmetrical sulfonium perchlorates.

One object of this invention, therefore, is to provide an improved process for synthesizing sulfonium perchlorates.

Another object is to provide a simple and efficient process for preparing sulfonium perchlorates in increased yield.

Yet another object is to prepare sulfonium perchlorates in a single step process by reacting an organic sulfide with an alcohol and perchloric acid.

Still another object is to provide a novel trialkylsulfonium perchlorate.

Other objects of the invention will in part be obvious and will in part appear hereinafter.

The invention accordingly comprises the processes involving the several steps and the relation and order of one or more of such steps with respect to each of the others, which are exemplified in the following detailed disclosure, and the scope of the application of which will be indicated in the claims.

The sulfonium perchlorates with which this invention is concerned may be symmetrical or unsymmetrical compounds of the general formula: $R_3S^{(+)}ClO_4^{(-)}$, wherein each R is alkyl or aralkyl and may be the same or different. As used herein, the terms "alkyl" and "aralkyl" include substituted derivatives thereof.

Prior to this invention, compounds of this formula were generally synthesized by reacting an organic sulfide with an organic halide:

$R_2S + RX \rightarrow R_3SX$ (wherein X represents a halogen ion)

and then forming the desired perchlorate by a second step wherein the halogen ion is replaced by ion exchange techniques with the perchlorate ion:

$R_3SX + ClO_4^{(-)} \rightarrow R_3S^{(+)}ClO_4^{(-)}$

As will be seen, such processes involve two separate steps to form the desired sulfonium perchlorate.

Moreover, in the case of unsymmetrical trialkylsulfonium perchlorates, that is, where at least two R's of the general formula are different, troublesome "alkyl scrambling" frequently occurs, thereby producing a plurality of different compounds. Since the addition of an alkyl halide to a sulfide is a reversible reaction, when two or more different alkyl radicals are involved, the products of the dissociation may be different from the original components:

$R_2S + R'X \rightleftharpoons R_2R'SX \rightleftharpoons RR'S + RX$ $RR'S + R'X \rightleftharpoons RR'_2SX \rightleftharpoons R'_2S + RX$ At equilibrium, there will be two sulfonium salts, three sulfides, $R_2S$, $RSR'$, and $R'_2S$, and two halides, $R'X$ and $RX$, or seven compounds in all. If there are three different alkyl groups, the situation will be even more complex. (See, for example, "Organic Chemistry of Bivalent Sulfur," by Reid, vol. II, page 72, Chemical Pub., N.Y., 1960.)

By the process of this invention, all of the above-mentioned problems are obviated and the sulfonium perchlorates may be prepared simply and efficiently in a single step reaction utilizing starting materials that are readily available and not as costly, for example, as the halides of the prior art processes.

According to one embodiment of the present invention, sulfonium perchlorates are prepared by reacting an organic sulfide, an alcohol and perchloric acid:

$R_2S + ROH + ClO_4^{(-)} \rightarrow R_3S^{(+)}ClO_4^{(-)}$

As was indicated previously, each R may be the same or different and each represents an alkyl or aralkyl radical or substituted derivative thereof.

The reaction is preferably carried out at elevated temperatures, say, for example, 60–115° C., and where one of the reactants is an alkanol, most preferably at reflux temperatures, that is, at the boiling point of the alkanol.

The following examples show by way of illustration and not by way of limitation how sulfonium perchlorates may be prepared in accordance with this embodiment of the invention.

*Example 1*

A solution of 5 mmoles of di-n-butyl sulfide in 5 ml. of n-butanol was mixed with 0.72 g. (5 mmoles) of 70% perchloric acid and heated under reflux for 24 hours. The mixture was then cooled to room temperature, diluted with 50 ml. of ether and filtered to collect the sulfonium salt. A 46% yield of tri-n-butylsulfonium perchlorate was recovered.

*Example 2*

The above procedure was repeated, substituting di-n-propyl sulfide and n-propanol for the respective butyl homologues. A 24% yield or tri-n-propylsulfonium perchlorate was recovered.

*Example 3*

A solution of 1.35 g. (15 mmoles) of diethyl sulfide and 2.16 g. (15 mmoles) of 70% perchloric acid in 40 ml. of ethanol was heated in a sealed vessel at 120° C., for 24 hours. The mixture was then cooled, diluted with 85 ml. of ether and filtered to collect the sulfonium salt. A 16% yield of triethylsulfonium perchlorate was recovered.

*Example 4*

A solution of 0.77 g. of dibenzyl sulfide (3.59 mmoles) in 5 ml. of benzyl alcohol was mixed with 0.512 g. (3.59 mmoles) of 70% perchloric acid. The resulting mixture was heated for 2.5 hours at 60–70° C., cooled to room temperature, diluted with ether and filtered. A 91% yield (1.32 g.) of tribenzylsulfonium perchlorate was recovered.

The following example illustrates the preparation of a new unsymmetrical sulfonium perchlorate by the novel process of this invention.

*Example 5*

A solution of 0.53 g. of di-n-butyl sulfide (3.59 mmoles) in 5 ml. of benzyl alcohol was mixed with 0.52 g. (3.59 mmoles) of 70% perchloric acid. The mixture was maintained at 70–80° C., for four hours and then cooled overnight. Ether was added and an oil separated which solidified upon chilling. After recrystallization from acetone-ether, 1.02 g. or an 83.5% yield of benzyl-di-(n-butyl) sulfonium perchlorate was recovered. It was a white solid melting at 71–73° C.

Analysis of this product:

|  | C | H |
|---|---|---|
| Calculated | 53.48 | 7.48 |
| Found | 53.25 | 7.21 |

According to a further embodiment of this invention, it has been found that the total yield of sulfonium perchlorate prepared by the novel process heretofore described may be increased by removal of water from the reaction mixture. While alcohols such as benzyl alcohol and its homologues generally give a satisfactory yield even without removal of water, in the reactions involving use of an alkanol, yields are generally poorer and removal of water during the reaction results in an appreciable increase in yield.

While I do not wish to be limited to any particular theory, it is believed that the reaction mechanism by which the sulfonium perchlorates are formed may be illustrated as follows:

(1) $\quad ROH_2^{(+)} + ClO_4^{(-)} \rightleftharpoons ROClO_3 + H_2O$ (2) $\quad ROClO_3 + R_2S \rightarrow R_3S^{(+)}ClO_4^{(-)}$ As illustrated in the first equation, the reaction between the alcohol and perchloric acid to form perchlorate ester and water is reversible. The addition of alkyl sulfide (Equation 2) irreversibly traps any perchlorate ester formed and acid is consumed until the increasing water content of the system completely eliminates ester formation. At this point an equilibrium yield of sulfonium salt is obtained, thus delimiting the overall yield of sulfonium perchlorate. From what has been said, it should be apparent that removal of water then allows Reaction 1 to proceed further, thereby increasing the total yield of perchlorate obtained.

The essence of this embodiment of the invention is, therefore, the recognition of the role that water plays in limiting the total yield of perchlorate obtainable, and the continuous removal of this undesirable water during the reaction, until substantially no more perchlorate is obtained, thereby materially increasing the overall yield.

The water may be removed by any of the processes per se which have heretofore been employed for removing water from reaction mixtures. Generally, a particularly good method, as will be appreciated by those skilled in the art, is azeotropic distillation. It should be noted, however, that while, generally speaking, azeotropic distillation is a particularly useful method of removing water, this procedure is not effective in the preparation of triethylsulfonium perchlorate, since diethyl sulfide and ethyl alcohol form an azeotrope which is also lost. Therefore, where diethyl sulfide and ethyl alcohol are employed in Equation 1, other means for removal of water should be employed.

The following example shows by way of illustration and not be way of limitation the embodiment wherein the yield of sulfonium perchlorate is increased by removal of water from the reaction mixture.

*Example 6*

A solution of 0.73 g. (5 mmoles) of di-n-butyl sulfide and 0.72 g. (5 mmoles) of 70% perchloric acid in 15 ml. of n-butanol was refluxed under a condenser with provision for periodic removal of solvent by distillation. A total of 6 ml. of distillate was collected over a 24 hour period. Near the end of the reflux period an insoluble oil appeared. The mixture was cooled and poured into 50 ml. or ether, precipitating 1.27 g. or 84% yield of tri-n-butylsulfonium perchlorate (cf. Example 2, wherein the yield was 46%).

Since certain changes may be made in the above process without departing from the scope of the invention herein involved, it is intended that all matter contained in the above description shall be interpreted as illustrative and not in a limiting sense.

What is claimed is:

1. The process which comprises reacting a mixture comprising an organic sulfide of the formula:

$$R_2S$$

an alcohol of the formula:

$$ROH$$

and perchloric acid to form a sulfonium perchlorate of the formula:

$$R_3S^{(+)}ClO_4^{(-)}$$

wherein each R is an alkyl radical, and continuously removing the thus-formed water from the reaction as it is formed whereby said reaction is allowed to go to completion, thereby increasing the yield of said perchlorate.

2. The process of forming unsymmetrical alkylsulfonium perchlorates of the formula:

$$R_3S^{(+)}ClO_4^{(-)}$$

which comprises refluxing a mixture of an organic sulfide of the formula:

$$R_2S$$

an alcohol of the formula:

$$ROH$$

and perchloric acid wherein R is an alkyl radical and at least two R's are different, and continuously removing the thus-formed water from the reaction, thereby increasing the yield of said unsymmetrical sulfonium perchlorate.

References Cited in the file of this patent

FOREIGN PATENTS 914,325 Germany _____ July 1, 1954
793,673 Great Britain _____ Apr. 23, 1958

OTHER REFERENCES

Hinsberg: Deut. Chem. 69, 492–495 (1936).
Swain et al.: J. Am. Chem. Soc. 80, 4089–4092 (1958).
Leaver et al.: J. Chem. Soc. (London), 1957, 39–46.
Lappert, Chem. and Ind. 1952, 53.